United States Patent [19]
Hellestam et al.

[11] 3,887,482
[45] June 3, 1975

[54] COMPOSITIONS FOR FLORIDATING DRINKING WATER

[75] Inventors: Carl-Johan Sigvard Hellestam; Karl-Axel Melkersson, both of Helsingborg; Rolf Olof Nilsson, Viken, all of Sweden

[73] Assignee: Boliden Aktiebolag, Sweden

[22] Filed: Oct. 9, 1973

[21] Appl. No.: 404,146

Related U.S. Application Data

[63] Continuation of Ser. No. 203,062, Nov. 29, 1971, abandoned.

[30] Foreign Application Priority Data
Nov. 30, 1970 Sweden............................ 16214/70

[52] U.S. Cl. .................... 252/175; 210/42; 210/47; 210/62; 423/128
[51] Int. Cl. .......................... C02b 1/18; C02b 9/00
[58] Field of Search ................... 210/42, 47, 51, 62; 252/175; 423/130, 32, 128

[56] References Cited
UNITED STATES PATENTS
2,643,179   6/1953   White .................................. 423/130

Primary Examiner—Leland A. Sebastian
Attorney, Agent, or Firm—Toren and McGeady

[57] ABSTRACT

The invention provides for a composition based on crystallized aluminium sulphate and containing a fluorine compound selected from the group consisting of NaF, HF, $H_2SiF_6$, $Na_2SiF_6$, $(NH_4)_2SiF_6$ and $Na_3AlF_6$ in an amount corresponding to 0.5 – 5 percent by weight of fluorine based on the weight of the composition, homogenously distributed therethrough. The composition is useful for purifying municipal water by flocculation while adding fluorine to form drinking water resulting in reduced dental caries. The invention also refers to precesses for preparing said composition and to a method of treating crude water to form drinking water containing fluorine.

11 Claims, No Drawings

COMPOSITIONS FOR FLORIDATING DRINKING WATER

This is a continuation of application Ser. No. 203,062, filed Nov. 29, 1971 now abandoned.

It is known that adding fluorine to drinking water results in reduced dental caries. The process of doing this is known as "fluoridation" and is presently practiced in many parts of the world. A content of about 1 mg fluorine per litre of drinking water is regarded to be suitable. Too high contents of fluorine in drinking water may, however, give raise to stains on the teeth and may also cause damages to the skeleton.

The crude water used for preparing municipal drinking water contains as a rule less than 0.5 mg F/l and a suitable soluble fluorine compound must, therefore, be added in order to obtain the desired content of about 1 mg/l.

If municipal drinking water is to be supplied with fluoride there is a hazard in the metering or dosing operation as such and malfunctions in connection with the dosage of the fluorine chemical could result in serious overdosage that might cause deleterious effects. The handling of concentrated fluorine chemicals is hazardous and, therefore, calls for a strict control and observation. Accidents, for instance in the form of leakage or spillage, result in serious hygienic risks for the personnel operating the plant. Moreover, the chemicals cause great corrosion problems. Against this background it is thus a desideratum to be able to add fluorine to drinking water in a reliable way, so that the right concentration of fluorine is obtained and overdosage or underdosage is avoided.

Irrespective of the fluoridation process as indicated above, natural waters, due to the fact that they normally contain varying amounts of suspended matter, are usually subjected to a precipiation and filtration procedure to remove such suspended matter. The usual practice of such removal is to subject the water to a treatment with aluminum sulphate for coagulating suspended matter in a flocculant precipitate, which usually is removed from the water by passing same through filter beds. Such treatment for removal of suspended matter from the water is, of course, entirely independent of that for effecting fluoridation.

Therefore it is an object of the present invention to provide a novel composition for use in the floridation of municipal water supplies and the like, said composition obviating the danger of separately supplying a fluorine compound to the water, and the fluoridation being practicible without the necessity of rearranging existing water supplying plants of installing new devices therein.

A further object of the invention is to provide a method of fluoridation of municipal water which is essentially of a self-regulating character with regard to the floridation obtained in that in practicing the method the fluorine content supplied to the water cannot reach a level deleterious to health, even though within reasonable limits the water to be treated initially contains fluorine.

A still further object of the invention is to provide a new process for preparing such composition to be used in the fluoridation of municipal water.

Further objects, advantages and procedural steps comprehended by the invention will be apparent from the following description of the invention.

In connection with the instant invention it has been found that the fluorine may be added to the water in connection with the purification thereof by means of flocculation with an aluminium sulphate containing fluorine. The aluminium sulphate for the purification by flocculation is added in substantially greater amounts than the amount of fluorine compound which need to be added for obtaining the desired fluoride content in the drinking water. In view of the fact that aluminium sulphate may be supplied and metered in such a way that the possible erroneous dosages that occur in practice are very small, the risk for a wrong dosage with regard to fluoride is almost completely eliminated by applying the art of the invention. The separate fluorine handling and metering is thus eliminated, which results in a number of advantages both from a hygienic and economic point of view. Thus, the process does not require other apparatus or maintenance than that required in conventional flocculation with aluminium sulphate.

Thus, the invention provides a composition for use in adding fluorine to drinking water for the purpose of reducing dental caries when using said water. The composition of this invention comprises crystallized aluminium sulphate in the form of a powder or a granulate and, homogeneously distributed through the mass of aluminium sulphate, a fluorine compound selected from the group consisting of $NaF$, $HF$, $H_2SiF_6$, $Na_2SiF_6$, $(NH_4)_2SiF_6$ and $Na_3AlF_6$. Such fluorine compound is present in the aluminium sulphate in an amount corresponding to 0.5 – 5 percent by weight of fluorine based on the weight of the composition, a preferred range being 1 – 3 percent by weight. Since the aluminium sulphate for the purpose of precipitating suspended matter in the crude water is usually added to the water in an amount of about 50 mg per litre of water the most preferred percentage with regard to the fluorine content of the aluminium sulphate is about 2 percent by weight resulting in a concentration of fluorine in the water of about 1 mg per litre.

The invention also provides a process of treating crude water to prepare drinking water containing fluorine. Such process resides in adding to said crude water in an amount effective for purifying the water by flocculation an aluminium sulphate composition as defined above, subjecting the flocculated water to sedimentation and filtration to remove precipitated matter therefrom. The aluminium sulphate composition is preferably added in an amount of about 15 – 150 mg per litre of water, preferably 25 – 75 mg per litre and particularly about 50 mg per litre, as indicated above.

In connection with work resulting in the present invention it has been found that the fluorine compound may be added to an aluminium sulphate melt or solution in the form of a suitable fluorine compound. Useful compounds for this purpose are: sodium fluoride, $NaF$, sodium-fluorosilicate, $Na_2SiF_6$, fluorosilicic acid, $H_2SiF_6$, cryolite, $Na_3AlF_6$, ammonium fluoro silicate $(NH_4)_2SiF_6$, and hydrofluoric acid, $HF$. Calcium fluoride is not a useful fluorine compound since gypsum is formed when the fluorine-containing aluminium sulphate is dissolved. The gypsum will be dissolved when the water is flocculated with the aluminium sulphate thereby adding to the hardness of the water. The amount of fluorine vaporized from the melt or solution during the process is only about 0.001 percent of the added amount, and when flocculating the water with aluminium sulphate produced in the manner indicated above more than 85 percent by weight of the fluoride added is found in the drinking water after the separation of the formed aluminium hydroxide flocks, provided that the original fluoride content of the water was low.

In order to arrive at a product of maximum homogeneity as regards the distribution of the fluorine compound in the crystallized aluminium sulphate a preferred way of adding the fluorine compound to the aluminium sulphate is to introduce that fluorine compound during the digestion of an appropriate aluminium starting material in sulphuric acid. This digestion is carried out in such a manner, that the aluminium starting material, for instance aluminium hydroxide, is allowed to react with the sulphuric acid at a temperature lying only a few degrees below the boiling point of the solution for a long period of time, until practically all of the aluminium hydroxide added has dissolved. The concentration of the solution with regard to the aluminium compound thereof, is at such a level that the solution contains 14 – 18 percent by weight of $Al_2O_3$ based on the weight of the solution. The sulphuric acid is reacted in a small deficit, i.e. the molar ratio of the solution with regard to Al to $SO_4$ shall be somewhat higher than the ratio of 2:3 as corresponding to neutral aluminium sulphate.

The fluorine compound or fluorine-containing chemical is added to the digestion solution after making a slurry of same in water. After completed digestion the solution is allowed to solidify to a solid, fluorine-containing aluminium sulphate.

It is also practically feasible to use bauxite or clay as an aluminium starting material. In these cases the solution is filtered usually at a concentration of about 8 percent by weight of $Al_2O_3$ and is then concentrated to a concentration of 14 – 18 percent by weight of $Al_2O_3$. When using these starting materials the fluorine compound is suitably added after the concentration of the solution.

It has also been found possible in the preparation of the fluoride-containing aluminium sulphate to add the florine chemical at another stage of the process for the preparation of aluminium sulphate, for instance immediately before the crystallization thereof.

Moreover, it has unexpectedly been found, that in flocculating crude water initially having a high floride content, said fluoride content in any case may be maintained unchanged and possibly also lowered by flocculation with fluoride-containing aluminium sulphate in accordance with the instant invention. This observation is also, of course, most essential in connection with avoiding overdosage of fluoride in the drinking water. In connection with this self-regulating feature as regards the fluorine content imparted to the drinking water it has been found that this effect of self-regulation is even more pronounced when a fluorine compound containing silicon is used as a constituent of the composition of the invention. This means that from the point of view of self-regulation the fluorine compounds sodium fluoro silicate, $Na_2SiF_6$, fluoro silicic acid $H_2SiF_6$, and ammonium fluoro silicate, $(NH_4)_2SiF_6$, are preferred. This aspect of the invention will be further explained below.

The invention will now be illustrated further by means of practical non-limiting examples applying the above indicated art.

EXAMPLE 1

To an aqueous aluminium sulphate solution containing about 17% by weight of $Al_2O_3$ divided into five portions of 100 gs each there is added 2 g fluorine in the form of $(NH_4)_2SiF_6$ (3.17 g), in the form of NaF (4.42 g), in the form of $Na_2SiF_6$ (3.30 g), in the form of $H_2SiF_6$ (9.43 g as a 26.8 percent solution), and in the form of $Na_3AlF_6$ (3.68 g), respectively. The aluminium sulphate melt is held at the boiling point for a period of time of about 1 hour, and each of the four portions are then poured into beakers. After cooling the product obtained is comminuted.

1000 ml of water is flocculated with 50 mg of the above prepared comminuted aluminium sulphate product containing fluoride, the amount of fluoride added to the water being 1 mg per litre of water. After sedimentation the clear water solution is analyzed on fluoride and aluminium. Flocculation is carried out on tap water and on deionized water and at different pH-values adjusted before the flocculation. The results are given in Table I below.

TABLE I

| Added Flourine compound when preparing the composition | pH before flocculation | Contents in the clear solution F mg/l | $Al_2O_3$ mg/l | Type of water |
|---|---|---|---|---|
| $(NH_4)_2SiF_6$ | 4 | 1.03 | 2.9 | Tap water |
| do. | 5 | 0.98 | 4.3 | do. |
| do. | 6 | 0.71 | 4.7 | do. |
| do. | 7 | 0.83 | 4.5 | do. |
| do. | 8 | 0.92 | 7.3 | do. |
| do. | 9 | 0.99 | 3.4 | do. |
| do. | 4 | 0.93 | 11 | Deionized water |
| do. | 5 | 0.94 | 10 | do. |
| do. | 6 | 0.71 | 6.1 | do. |
| do. | 7 | 0.51 | 1.4 | do. |
| do. | 8 | 0.77 | 2 | do. |
| do. | 9 | 0.86 | 8.8 | do. |
| NaF | 4 | 1.12 | 10.3 | Tap water |
| do. | 5 | 1.01 | 3.3 | do. |
| do. | 6 | 0.78 | 2.5 | do. |
| do. | 7 | 0.86 | 1.6 | do. |
| do. | 8 | 1.03 | 1.9 | do. |
| do. | 9 | 1.05 | 3.8 | do. |
| do. | 4 | 1.00 | 10.8 | Deionized water |
| do. | 5 | 0.86 | 8.6 | do. |
| do. | 6 | 0.53 | 3.5 | do. |
| do. | 7 | 0.61 | 3.7 | do. |
| do. | 8 | 0.86 | 2.6 | do. |
| do. | 9 | 0.97 | 11.6 | do. |
| $Na_2SiF_6$ | 4 | 1.05 | 10.0 | Tap water |
| do. | 5 | 0.99 | 4.2 | do. |
| do. | 6 | 0.75 | 1.8 | do. |
| do. | 7 | 0.85 | 1.0 | do. |
| do. | 8 | 0.94 | 1.7 | do. |
| do. | 9 | 0.99 | 2.6 | do. |
| do. | 4 | 0.94 | 9.6 | Deionized water |
| do. | 5 | 0.96 | 9.1 | do. |
| do. | 6 | 0.72 | 7.3 | do. |
| do. | 7 | 0.50 | 3.5 | do. |
| do. | 8 | 0.77 | 4.5 | do. |
| do. | 9 | 0.88 | 8.2 | do. |
| $H_2SiF_6$ | 4 | 1.03 | | Tap water |
| do. | 5 | 0.92 | | do. |
| do. | 6 | 0.68 | | do. |
| do. | 7 | 0.82 | | do. |
| $H_2SiF_6$ | 8 | 0.95 | | Tap water |
| do. | 9 | 0.96 | | do. |
| do. | 4 | 1.00 | | Deionized water |
| do. | 5 | 0.86 | | do. |
| do. | 6 | 0.51 | | do. |
| do. | 7 | 0.50 | | do. |
| do. | 8 | 0.62 | | do. |
| do. | 9 | 0.83 | | do. |
| $Na_3AlF_6$ | 4 | 1.06 | | Tap water |
| do. | 5 | 0.95 | | do. |
| do. | 6 | 0.71 | | do. |
| do. | 7 | 0.70 | | do. |
| do. | 8 | 0.73 | | do. |
| do. | 9 | 0.94 | | do. |

TABLE I-Continued

| Added Flourine compound when preparing the composition | pH before flocculation | Contents in the clear solution F mg/l | Contents in the clear solution Al$_2$O$_3$ mg/l | Type of water |
|---|---|---|---|---|
| do. | 4 | 0.90 | | Deionized water |
| do. | 5 | 0.77 | | do. |
| do. | 6 | 0.54 | | do. |
| do. | 7 | 0.51 | | do. |
| do. | 8 | 0.51 | | do. |
| do. | 9 | 0.87 | | do. |

As is clear from the above table the major part of the added fluoride is found in the purified water, the water being tap water, and as expected the maximum precipitation of fluoride as well of aluminium ions is obtained in the pH-range 6–8. The relatively high figures on remaining aluminium in deionized water in the pH-range 6–8 depends on the fact that the formation of aluminium hydroxide flocks is slower the cleaner the water is. The fact that the fluoride content in certain experiments on tap water exceeds 1 in spite of the fact that only 1 mg of fluoride is been added per litre of water depends on the fact that the used water initially contains fluoride.

EXAMPLE 2

The fluorine-containing aluminium sulphate is prepared in connection with the crystallization of aluminium sulphate by adding, immediately before the crystallization, different fluorine compounds to the melt in the amounts indicated below.

| | |
|---|---|
| NaF | 4.42 g/100 g aluminium sulphate |
| Na$_2$SiF$_6$ | 3.30 g/100 g aluminium sulphate |
| (NH$_4$)$_2$SiF$_6$ | 3.17 g/100 g aluminium sulphate. |

+/ Due to the immediate crystallization of the melt the fluorine compounds added have no time to dissolve therein but are merely evenly distributed before crystallization takes place.

The results on flocculating tap water with 50 mg of the above prepared fluorine-containing aluminium sulphate per litre of water is shown in Table II below. As is clear therefrom, the same results are obtained as in flocculating with a fluorine-containing aluminium sulphate prepared from a solution as per the beforegoing Example I.

Table II

| Fluorine compound added in preparing the composition | pH before flocculation | Contents in the clear solution F, mg/l |
|---|---|---|
| NaF | 6 | 0.77 |
|  | 7 | 0.84 |
|  | 8 | 0.95 |
| (NH$_4$)$_2$SiF$_6$ | 6 | 0.63 |
|  | 7 | 0.80 |
|  | 8 | 0.92 |
| Na$_2$SiF$_6$ | 6 | 0.72 |
|  | 7 | 0.86 |
|  | 8 | 0.91 |

In the table below there is stated the amount of fluorine in percent leaving in gas form when preparing the above aluminium sulphate melts. As is clear from this Table III the fluoride loss is almost negligible.

Table III

| 100 g ALS + | Loss of F % |
|---|---|
| 3.17 g (NH$_4$)$_2$SiF$_6$ | 0.0013 |
| 4.42 g NaF | 0.0006 |
| 3.30 g Na$_2$SiF$_6$ | 0.0010 |
| 9.43 g 26.8 % solution of H$_2$SiF$_6$ | 0.0011 |

ALS = aluminium sulphate containing about 17 % by weight of Al$_2$O$_3$.

In order to investigate the conditions when applying the art of the instant invention on fluoridation of water initially containing essential amounts of fluoride, the experiments shown below in Table IV are carried out. The added amount of fluoride-containing aluminium sulphate containing 2% by mg/l of F is in all cases 50 mg/H$_2$O and, accordingly, the fluoride content added with the aluminium sulphate is 1 mg/l H$_2$O. The fluorine compound used is NaF and Na$_2$SiF$_6$, respectively.

The experiments are started from water initially added with varying amounts of fluoride, the water being then treated by the addition of aluminium sulphate containing 2% of fluorine. The experiments are carried out at pH-values varying about neutral pH.

Table IV

| Experiment No. | pH adjusted to | F-content before addition of chemical mg/l H$_2$O | F-content after addition of chemical mg/l H$_2$O | Final F-content after flocculation and filtration, mg F/l (NaF) | Final F-content after flocculation and filtration, mg F/l (Na$_2$SiF$_6$) |
|---|---|---|---|---|---|
| 1 | 6 | 0.8 | 1.8 | 1.1 | 1.0 |
| 2 | 6 | 1.3 | 2.3 | 1.3 | 1.2 |
| 3 | 6 | 2.3 | 3.3 | 2.3 | 2.1 |
| 4 | 6 | 3.3 | 4.3 | 2.9 | 2.4 |
| 5 | 6 | 4.3 | 5.3 | 3.9 | 3.2 |
| 6 | 7 | 0.8 | 1.8 | 1.3 | 1.1 |
| 7 | 7 | 1.3 | 2.3 | 1.5 | 1.3 |
| 8 | 7 | 2.3 | 3.3 | 2.4 | 2.0 |
| 9 | 7 | 3.3 | 4.3 | 3.0 | 2.6 |
| 10 | 7 | 4.3 | 5.3 | 3.8 | 3.1 |
| 11 | 8 | 0.8 | 1.8 | 1.1 | 1.1 |
| 12 | 8 | 1.3 | 2.3 | 1.7 | 1.5 |
| 13 | 8 | 2.3 | 3.3 | 2.4 | 2.1 |
| 14 | 8 | 3.3 | 4.3 | 3.4 | 2.8 |
| 15 | 8 | 4.3 | 5.3 | 4.0 | 3.3 |

As is clear from the results shown, the addition of aluminium sulphate to water initially containing fluorine results, at a low initial content of fluoride, in an increase of the fluorine content to a value somewhat lower than that corresponding to the sum of the original content and the added amount, whereas at increasing original contents of fluoride this increase is significantly smaller which means that some sort of self-regulation takes place. Instead the result is that the fluoride added with the aluminium sulphate is not significantly added to the original content, said content being essentially unchanged. As is clear from the experiment at pH 7 starting from water containing 4.0 mg of fluoride/l there is instead obtained a lowering of said initial content to 3.8 mg/l. The above phenomenon can be explained as follows.

When aluminium hydroxide is precipitated from water by hydrolysis the hydroxide will not be pure when the water contains fluoride ions. Part of the hydroxide ions in Al(OH)$_3$ will, in view of the strong affinity of the fluoride ions to aluminium ions, be replaced by fluoride ions. The ratio F:Al in the precipitate is depending on the ratio F:Al which is prevailing in the water when the precipitate is formed. If said ratio F:Al in the water is high the ratio F:Al in the precipitate will also be high and a greater amount of F will thus be precipitated per mole of Al than when the F-content of the water is low.

A comparison of the final fluorine concentration of the flocculation and filtration when using on the one hand NaF and on the other hand $Na_2SiF_6$ according to Table IV above shows that self-regulating feature of the art of the invention is even more pronounced when using the latter compound, i.e. the compound containing silicon. Even if the invention is not to be bound by any theory, this observation may be explained by referring to the fact, that precipitation by flocculation with aluminium hydroxide usually is improved in the presence of silicon in the form of silicic acid taking part in the precipitation. This theory is supported by further experiments presented below showing that using an aluminium sulphate composition including a fluorine compound containing silicon gives a better reading with regard to turbidity after flocculation than when using a composition containing a fluorine compound free from silicon.

As is also clear from Table IV above, less than half of the added fluoride amount will be found in the water if the initial fluoride content was 2 mg F/l. At the original content of about 3 mg F/l about the same amount of fluoride will be precipitated as is added and at an original content of 4 mg F/l in some cases more fluoride will be precipitated than is added. At further increasing fluoride contents an ever increasing part of the original fluorine amount will be precipitated. The degree of precipitation of the initial amount of fluoride increases with increasing amount of added aluminium, but since from an economic point of view it is desirable to maintain the aluminium addition at the lowest possible level this phenomenon may not be utilized to a greater extent in practice. However, it may be said that the process of this invention is self-regulating when treating water initially containing fluoride, and this means that it is possible to avoid an increase of an initially high content of fluoride.

EXAMPLE 3

The above experiments show the effect of the treatment of water having initially different contents of fluorine. This example refers to experiments using varying amounts of an aluminium sulphate composition added to a crude water containing the same initial amount of fluorine.

Crude water containing 0.4 mg fluorine per litre is treated with an aluminium sulphate composition of the invention containing 2% by weight of a fluorine in the form of sodium fluoride, NaF. As in the previous experiments the crude water is treated with an aluminium sulphate composition, the resulting flocks being separated by sedimentation and filtration. The results on the experiments are given in Table V below, pH in the treated water being in all cases about 7 after flocculation.

Table V

| ALS added mg/l of water | Fluorine, mg/l | | | |
|---|---|---|---|---|
| | Initially in the water | Added with ALS | Total content before flocc. | Final content after flocc. |
| 40 | 0.4 | 0.8 | 1.2 | 0.77 |
| 50 | do. | 1.0 | 1.4 | 0.83 |

Table V-Continued

| ALS added mg/l of water | Fluorine, mg/l | | | |
|---|---|---|---|---|
| | Initially in the water | Added with ALS | Total content before flocc. | Final content after flocc. |
| 75 | do. | 1.5 | 1.9 | 0.94 |
| 100 | do. | 2.0 | 2.4 | 0.99 |
| 125 | do. | 2.5 | 2.9 | 1.10 |

The experiments show, that the self-regulating character of the process of the invention is even more pronounced when the total amount of fluorine involved is increased by increasing the amount of aluminium sulphate composition added to the water. This is an important aspect of the invention, since it enables the use of significantly higher amounts of aluminium sulphate to be added to crude waters having a high degree of contamination without resulting in a corresponding increase of the fluorine content of the water after the treatment thereof. This example also shows that by applying the process of this invention in practice the aluminium sulphate composition need not be added in a highly sophisticated manner as regards the dosage obtained, since the final content of the treated water with regard to fluorine does not vary significantly when the supplied amount of aluminium sulphate composition varies within a relatively wide range.

EXAMPLE 4

The following experiment is made in order to investigate the degree of purification on crude water treated with an aluminium sulphate composition with or without content of fluorine compound.

Starting from tap water the contaminated water is prepared by adding clay. This water is then treated with aluminium sulphate compositions of different character, namely on the one hand containing the fluorine compounds NaF and $Na_2SiF_6$ in an amount equivalent to 2% by weight of fluorine in the composition, and on the other hand a composition void of any fluorine compound. The aluminium sulphate composition is added in an amount of 50 mg per litre of water in all cases and the surface load of the water is 0.6 m/h. The results of the experiments are given in Table VI below.

Table VI

| Fluorine compound in ALS (2 % F) | Turbidity, JTU | |
|---|---|---|
| | before flocc. | after flocc. |
| NaF | 18 | 4 |
| $Na_2SiF_6$ | 18 | 3 |
| None | 18 | 5 |

JTU = Jackson turbidity units.

Table VI above shows that using a composition containing as a fluorine compound $Na_2SiF_6$ gives an improved purification of the water, which seems to explain why the self-regulating character of the process of the invention is even better when using a fluorine compound containing silicon.

It is obvious from the above description, that this invention results in several advantages. Thus, municipal water may be fluorinated in a simple and reliable way while using the customary methods and the conventional plants for the purification of the water by flocculation with aluminium sulphate the hazardous handling of different fluorine compounds is avoided by using the composition of the invention, the appearance of which does not differ from that of conventional aluminium sulphate used for water treatment. Because of the self-regulating character of the process of the invention the fluoridation cannot be carried to a point which is dagerous to health even where excessive amounts of the composition of the invention is introduced into the water.

The invention is not to be limited to the specific examples given above and the specific ways of practicing the invention, but may modifications and variations within the scope of the appended claims will readily occur to those skilled in the art.

What is claimed is:

1. A composition for use in adding fluorine to drinking water for the purpose of reducing dental caries when using said water, such addition of fluorine being carried out in connection with purification of crude water to form drinking water by flocculation with aluminium sulphate, sedimentation and filtration, comprising crystallized aluminium sulphate and homogeneously distributed therethrough, a fluorine compound selected from the group consisting of NaF, $H_2SiF_6$, $Na_2SiF_6$, $(NH_4)_2SiF_6$ and $Na_3AlF_6$ in an amount corresponding to 0.5 – 5 percent by weight of fluorine based on the weight of the composition.

2. A composition according to claim 1 wherein at least 20 percent of the fluorine of the composition originates from a compound selected from $H_2SiF_6$, $Na_2SiF_6$ and $(NH_4)_2SiF_6$.

3. A composition according to claim 1, wherein said fluorine compound is $Na_3AlF_6$.

4. A composition according to claim 1, wherein said fluorine compound is present in an amount corresponding to 1 – 3 percent by weight of fluorine based on the weight of the composition.

5. A composition according to claim 1, wherein said fluorine compound is present in an amount corresponding to about 2 percent by weight of fluorine based on the weight of the composition.

6. A process for preparing the composition of claim 1, comprising preparing an aqueous solution or melt of aluminium sulfate, adding a predetermined amount of a fluorine compound selected from the group consisting of NaF, $H_2SiF_6$, $Na_2SiF_6$, $(NH_4)_2SiF_6$ and $Na_3AlF_6$ to said solution or melt, and crystallizing out an aluminium sulphate composition having said fluorine compound homogeneously distributed through the mass of the composition in an amount of 0.5 – 5 percent by weight of fluorine based on the weight of the composition.

7. A process according to claim 6, wherein at least 20 percent of the fluorine of the composition originates from a compound selected from $H_2SiF_6$, $Na_2SiF_6$ and $(NH_4)_2SiF_6$.

8. A process according to claim 6, wherein said fluorine compound is $Na_3AlF_6$.

9. A process for preparing the compound of claim 1, comprising digesting an aluminium bearing material in concentrated sulphuric acid in an amount such that the molar ratio of Al to $SO_4$ is slightly in excess of 2:3 while adding said fluorine compound to form an aluminium solution or melt, and crystallizing out an aluminium sulphate composition having said fluorine compound homogeneously distributed through the mass of the composition in an amount of 0.5–5 percent by weight of fluorine based on the weight of the composition.

10. A process according to claim 9, wherein at least 20 percent of the fluorine of the composition originates from a compound selected from $H_2SiF_6$, $Na_2SiF_6$, and $(NH_4)_2SiF_6$.

11. A process according to claim 9, wherein said fluorine compound is $Na_3AlF_6$.

* * * * *